Dec. 9, 1969  F. SCHLEGEL  3,482,902
MODIFIED SYMMETRICAL WIDE-ANGLE OBJECTIVE
Filed June 21, 1966

INVENTOR
Franz Schlegel

United States Patent Office 3,482,902
Patented Dec. 9, 1969

3,482,902
MODIFIED SYMMETRICAL WIDE-ANGLE OBJECTIVE
Franz Schlegel, Munich, Germany, assignor to Optische Werke G. Rodenstock, Munich, Germany
Filed June 21, 1966, Ser. No. 559,158
Claims priority, application Germany, Oct. 14, 1965, O 11,178
Int. Cl. G02b 9/34
U.S. Cl. 350—209       4 Claims

ABSTRACT OF THE DISCLOSURE

A wide angle objective of the modified symmetrical type consisting of two spaced sets of glasses, each set including an inner, positive, simple, meniscus-shaped lens and an outer negative, cemented doublet whose divergent member is made of telescope flint. Chromatic aberration is reduced to an insignificant value over a wide range of image-to-object ratios when specified parameters are maintained.

---

This invention relates to an improvement in photographic objectives having six glasses and eight air-glass surfaces and being of symmetrical or modified symmetrical construtcion.

The type of objective with which this invention is more specifically concerned has two sets of glasses separated by a relatively wide air space normally receiving the stop, each set consisting of a simple lens in the form of a positive meniscus adjacent the wide air space and an outer divergent cemented doublet. Dimensions of the known symmetrical lenses of the afore-described type must be modified to deviate from strict symmetry to avoid aberrations when more than a moderate aperture is required, and when the object is much larger than the image produced. This limitation applies not only to the photography of remote objects, but also to the use of the lenses in enlargers having even moderate magnification.

The object of the invention is the provision of a photographic objective suitable for camera use and enlarger use which has an angular field of 60° or somewhat more, an f/number of 7 or better and which satisfies unusually strict quality requirements.

More specifically, the invention aims at a reduction in the residual axial and lateral chromatic aberration to values much lower than those in presently available lenses of the symmetrical type so that chromatic aberration is insignificant over a wide range of image-to-object ratios.

It has been found that the desired correction can be achieved by using an optical glass of a normal dispersion, such as telescope flint, in the diverging member of each cemented doublet. This permits an at least partly apochromatic correction to be achieved. The indices of refraction of the several glasses employed preferably rise steadily from the stop in both outward directions.

In an objective having an equivalent focal length $f'$, the radii of curvature $R_1$ to $R_{10}$ of the ten lens surfaces should satisfy the following conditions:

$$0.19f' < R_1 < 0.25f'$$
$$-R_2, +R_9 > f'$$
$$0.12f' < R_3, -R_8 < 0.18f'$$
$$0.16f' < R_4, -R_7 < 0.30f'$$
$$0.27f' < R_5, -R_6 < 0.50f'$$
$$0.15f' < -R_{10} < 0.23f'$$

Figure 1:
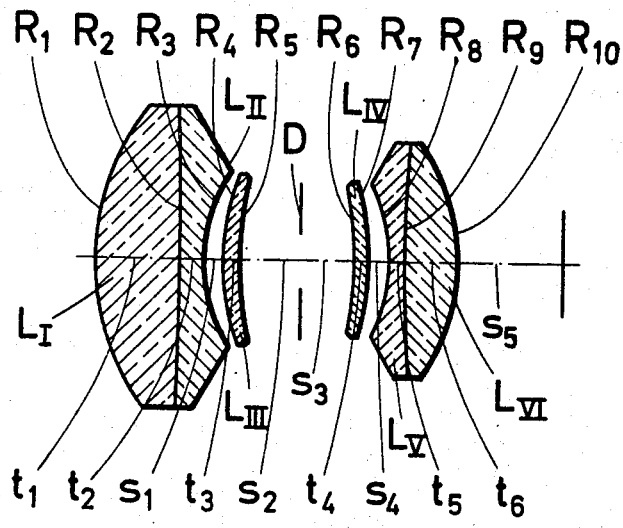
Figure 2:
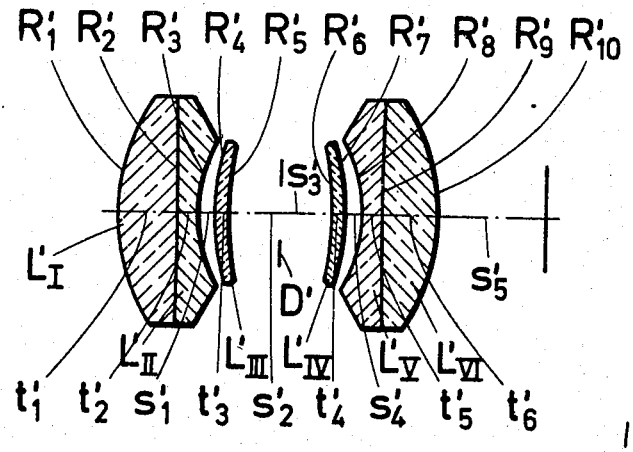

The exact nature of this invention as well as other objects and advantages thereof will be readily apparent from consideration of the following description of preferred embodiments when considered in connection with the accompanying drawings in which:

FIG. 1 schematically illustrates a semi-symmetrical objective of the invention; and
FIG. 2 shows a fully symmetrical objective in a corresponding manner.

The objective illustrated in FIG. 1 comprises a front component consisting of a cemented negative doublet $L_I$, $L_{II}$ and an air spaced, simple, positive meniscus $L_{III}$, whose concave air-glass surfaces are directed toward a central, large air space in which a stop D is arranged. The rear component similarly consists of a simple, positive meniscus $L_{IV}$ and a cemented negative doublet $L_V$, $L_{VI}$ air-spaced from the meniscus $L_{IV}$. The two concave air-glass surfaces are directed toward the stop D, as are the convex cemented surfaces of the doublets.

The radii $R_1$ to $R_{10}$, thicknesses $t_1$ to $t_5$, separations $s_1$ to $s_4$, and the back focus $s_5$, indices of refraction $n_E$, and Abbe numbers $V_E$ of the objective illustrated in FIG. 1 are shown in Table 1. The telescope flint of the divergent doublet elements is a commercially available glass (Schott KzF1).

TABLE 1
[Relative aperture 1;5:6, f'=100 mm.]

| Glass | Radii, mm. | Thicknesses and separations, mm. | $n_E$ | $V_E$ |
|---|---|---|---|---|
| $L_I$ | $R_1=+22.79$ | $t_1=8.08$ | 1.6055 | 60.5 |
| $L_{II}$ | $R_2=-774$ | $t_2=2.40$ | 1.5543 | 49.3 |
|  | $R_3=+14.65$ | $s_1=1.20$ |  |  |
|  | $R_4=+20.20$ |  |  |  |
| $L_{III}$ |  | $t_3=1.89$ | 1.5201 | 65.0 |
|  | $R_5=+31.94$ | $s_2=5.3$ |  |  |
|  |  | $s_3=4.8$ |  |  |
|  | $R_6=-42.35$ |  |  |  |
| $L_{IV}$ |  | $t_4=1.37$ | 1.5201 | 65.0 |
|  | $R_7=-25.83$ | $s_4=1.63$ |  |  |
|  | $R_8=-14.93$ |  |  |  |
| $L_V$ |  | $t_5=1.66$ | 1.5543 | 49.3 |
|  | $R_9=+142.7$ |  |  |  |
| $L_{VI}$ |  | $t_6=4.77$ | 1.6055 | 60.5 |
|  | $R_{10}=-17.95$ |  |  |  |
|  |  | $s_5=+83.5$ |  |  |

The corresponding values of radii $R'_1$ to $R'_{10}$, thicknesses $t'_1$ to $t'_{10}$, separations $s'_1$ to $s'_4$, and back focus $s'_5$ in the objective of the invention illustrated in FIG. 5 are listed in Table 2 together with the indices of refraction and Abbe numbers of the glasses $L'_I$ to $L'_{VI}$.

TABLE 2
[Relative aperture 1:6.8, f'=100 mm.]

| Glass | Radii, mm. | Thicknesses and separations, mm. | $n_E$ | $V_E$ |
|---|---|---|---|---|
| $L'_I$ | $R'_1=+20.62$ | $t'_1=6.60$ | 1.6055 | 60.5 |
| $L'_{II}$ | $R'_2=-247$ | $t'_2=2.36$ | 1.5543 | 49.3 |
|  | $R'_3=+15.18$ | $s'_1=1.45$ |  |  |
|  | $R'_4=+23.30$ |  |  |  |
| $L'_{III}$ |  | $t'_3=1.67$ | 1.5201 | 65.0 |
|  | $R'_5=+37.35$ | $s'_2=5.3$ |  |  |
|  |  | $s'_3=5.3$ |  |  |
|  | $R'_6=-37.35$ |  |  |  |
| $L'_{IV}$ |  | $t'_4=1.67$ | 1.5201 | 65.0 |
|  | $R'_7=-23.30$ | $s'_4=1.45$ |  |  |
|  | $R'_8=-15.18$ |  |  |  |
| $L'_V$ |  | $t'_5=2.36$ | 1.5543 | 49.3 |
|  | $R'_9=+247$ |  |  |  |
| $L'_{VI}$ |  | $t'_6=6.60$ | 1.6055 | 60.5 |
|  | $R'_{10}=-20.62$ |  |  |  |
|  |  | $s'_5=+80.6$ |  |  |

It will be appreciated that at least some of the advantages of the invention can be achieved with other objectives wherein the ratios of the thicknesses and separations to the equivalent focal length, the values of surface refractive powers, the values of refractive indices, and the Abbe numbers $V_E$ do not differ substantially from the number indicated above.

It should be understood, therefore, that the foregoing description relates only to preferred embodiments of the invention chosen for the purpose of the disclosure.

What is claimed is:

1. A photographic objective having six glasses which are, in axial sequence, $L_I$ to $L_{VI}$, said glasses being arranged in two sets of three glasses each, said sets defining therebetween a relatively wide air space adapted to receive a stop, each set consisting of a simple lens in the form of a positive meniscus contiguously adjacent said air space, and an outer divergent cemented doublet airspaced from said simple lens, each doublet having a convergent member and a divergent member, the divergent member of each doublet consisting of telescope flint, said glasses having respective thicknesses $t_1$ to $t_6$, being separated from each other by distances $s_1$, $s_2+s_3$, and $s_4$, and having radii of curvature $R_1$ to $R_{10}$, indices of refraction $n_E$, and Abbe numbers $V_E$, the values of said thicknesses, radii, distances, indices of refraction, and Abbe numbers being substantially as listed below, the radii, thicknesses, and separations being listed as functions of the equivalent focal length $f'$ of said objective:

| Glass | Radii x f'/100 | Thicknesses and separations x f'/100 | $n_E$ | $V_E$ |
|---|---|---|---|---|
| $L_I$ | $R_1=+22.79$ | $t_1=8.08$ | 1.6055 | 60.5 |
| $L_{II}$ | $R_2=-774$ | $t_2=2.40$ | 1.5543 | 49.3 |
|  | $R_3=+14.65$ | $s_1=1.20$ |  |  |
| $L_{III}$ | $R_4=+20.20$ | $t_3=1.89$ | 1.5201 | 65.0 |
|  | $R_5=+31.94$ | $s_2+s_3=10.1$ |  |  |
| $L_{IV}$ | $R_6=-42.35$ | $t_4=1.37$ | 1.5201 | 65.0 |
|  | $R_7=-25.83$ | $s_4=1.63$ |  |  |
| $L_V$ | $R_8=-14.93$ | $t_5=1.66$ | 1.5543 | 49.3 |
| $L_{VI}$ | $R_9=+142.7$ | $t_6=4.77$ | 1.6055 | 60.5 |
|  | $R_{10}=-17.95$ |  |  |  |

2. A photographic objective having six glasses which are, in axial sequence, $L_I$ to $L_{VI}$, said glasses being arranged in two sets of three glasses each, said sets defining therebetween a relatively wide air space adapted to receive a stop, each set consisting of a simple lens in the form of a positive meniscus contiguously adjacent said air space, and an outer divergent cemented doublet airspaced from said simple lens, each doublet having a convergent member and a divergent member, the divergent member of each doublet consisting of telescope flint, said glasses having respective thicknesses $t_1$ to $t_6$, being separated from each other by distances $s_1$, $s_2+s_3$, and $s_4$, and having radii of curvature $R_1$ to $R_{10}$, indices of refraction $n_E$, and Abbe numbers $V_E$, the values of said thicknesses, radii, distances, indices of refraction, and Abbe numbers being substantially as listed below, the radii, thicknesses, and separations being listed as functions of the equivalent focal length $f'$ of said objective:

| Glass | Radii x f'/100 | Thicknesses and separations x f'/100 | $n_E$ | $V_E$ |
|---|---|---|---|---|
| $L_I$ | $R_1=+20.62$ | $t_1=6.60$ | 1.6055 | 60.5 |
| $L_{II}$ | $R_2=-247$ | $t_2=2.36$ | 1.5543 | 49.3 |
|  | $R_3=+15.18$ | $s_1=1.45$ |  |  |
| $L_{III}$ | $R_4=+23.30$ | $t_3=1.67$ | 1.5201 | 65.0 |
|  | $R_5=+37.35$ | $s_2+s_3=10.6$ |  |  |
| $L_{IV}$ | $R_6=-37.35$ | $t_4=1.67$ | 1.5201 | 65.0 |
|  | $R_7=-23.30$ | $s_4=1.45$ |  |  |
| $L_V$ | $R_8=-15.18$ | $t_5=2.36$ | 1.5543 | 49.3 |
| $L_{VI}$ | $R_9=+247$ | $t_6=6.60$ | 1.6055 | 60.5 |
|  | $R_{10}=-20.62$ |  |  |  |

3. An objective as set forth in claim 1, further comprising a stop in said air space, spacedly interposed between said simple lenses $L_{III}$ and $L_{IV}$, the spacing of said stop from said simple lens $L_{III}$ being $s_2=0.053f'$, and the spacing of said stop from said simple lens $L_{IV}$ being $s_3=0.048f'$, the relative aperture of said objective being at least $f=1:7$.

4. An objective as set forth in claim 2, further comprising a stop in said air space, spacedly interposed between said simple lenses $L_{III}$ and $L_{IV}$, the spacing of said stop from each of said simple lenses being $0.053f'$, the relative aperture of said objective being at least $f=1:7$.

References Cited

UNITED STATES PATENTS 2,544,901  3/1951  Schade _____ 350—222
1,777,262  9/1930  Hasselkus et al. _____ 350—220
3,221,601  12/1965  Betensky et al. _____ 350—220

FOREIGN PATENTS 592,144  9/1947  Great Britain.
978,784  12/1964  Great Britain.

JOHN K. CORBIN, Primary Examiner

U.S. Cl. X.R.

350—220